(12) United States Patent
Hamm et al.

(10) Patent No.: US 6,870,135 B2
(45) Date of Patent: Mar. 22, 2005

(54) BEVERAGE CONTAINER WARMER

(75) Inventors: Andrew J. Hamm, Seattle, WA (US); Cody Lord, Seattle, WA (US); Steve Clark, Seattle, WA (US)

(73) Assignee: HLC Efficiency Products LLC, Seattle, WA (US)

( * ) Notice: Subject to any disclaimer, the term of this patent is extended or adjusted under 35 U.S.C. 154(b) by 0 days.

(21) Appl. No.: 10/754,786

(22) Filed: Jan. 8, 2004

(65) Prior Publication Data

US 2004/0139860 A1 Jul. 22, 2004

Related U.S. Application Data

(60) Provisional application No. 60/440,182, filed on Jan. 14, 2003.

(51) Int. Cl.[7] .................................................. A47J 36/26
(52) U.S. Cl. ........................ 219/386; 219/387; 219/202; 219/432; 219/433
(58) Field of Search ................................ 219/385, 386, 219/201, 202, 429, 432, 433, 528, 529, 387, 549

(56) References Cited

U.S. PATENT DOCUMENTS

| | | | | |
|---|---|---|---|---|
| 2,518,538 A | * | 8/1950 | Giblin ........................ 219/202 |
| 2,541,218 A | | 2/1951 | Doerr | |
| 3,079,486 A | * | 2/1963 | Wincheil .................... 219/528 |
| 3,231,716 A | * | 1/1966 | Van Den Bosch .......... 219/433 |
| 3,296,415 A | * | 1/1967 | Eisler ........................ 219/385 |
| 3,405,899 A | * | 10/1968 | Trachtenberg et al. ...... 219/202 |
| 3,432,641 A | | 3/1969 | Welke | |
| 3,500,014 A | * | 3/1970 | Longo ........................ 219/211 |
| 3,931,494 A | | 1/1976 | Fisher et al. | |
| 4,065,660 A | * | 12/1977 | Berard ........................ 219/535 |
| 4,095,090 A | * | 6/1978 | Pianezza ..................... 219/441 |
| 4,279,255 A | * | 7/1981 | Hoffman ..................... 219/211 |
| 4,463,664 A | * | 8/1984 | Peace ........................ 99/323.3 |
| 4,801,782 A | * | 1/1989 | Ineson ........................ 219/438 |
| 4,827,107 A | * | 5/1989 | Peery ......................... 219/521 |
| 4,833,299 A | | 5/1989 | Estes | |
| 5,208,896 A | | 5/1993 | Katayev | |
| 5,283,420 A | | 2/1994 | Montalto | |
| 5,408,068 A | * | 4/1995 | Ng ............................ 219/202 |
| 5,436,429 A | * | 7/1995 | Cline ......................... 219/202 |
| 5,786,574 A | * | 7/1998 | Garnett ....................... 219/529 |
| 6,000,224 A | * | 12/1999 | Foye ........................... 62/3.2 |

(List continued on next page.)

OTHER PUBLICATIONS

Johnson Smith Company "Smart Mug", CleverGear web-site catalog, URL http://www.clevergear.com/website/store/product_detail.asp?UID=2004032819272591&item_no=51102&keyword=cauto&cat_keyword=cauto&search_page_no=3.

AUTOSPORT"Heated Travel Mug", AutoSport web-site catalog URL http://www.autosportcatalog.com/index.cfm?fa=p&pid=565.

*Primary Examiner*—Joseph Pelham
(74) *Attorney, Agent, or Firm*—Laurence C. Bonar

(57) ABSTRACT

The invention provides an electrically heated jacket to maintain a hot beverage contained in a disposable hot-beverage container at optimum temperature for consumption. Electrical power for heating may be provided, in various embodiments, by household electric power, electric power from a motor vehicle electrical system, or batteries, which may be disposable or rechargeable. The invention also provides a method for keeping a hot beverage warm comprising providing freshly recharged batteries convenient to the point-of-sale of hot beverages.

28 Claims, 5 Drawing Sheets

U.S. PATENT DOCUMENTS

| | | | | |
|---|---|---|---|---|
| 6,013,901 A | * | 1/2000 | Lavoie | 219/435 |
| 6,054,691 A | | 4/2000 | McGwire | |
| 6,060,700 A | * | 5/2000 | Perlman et al. | 219/202 |
| 6,072,161 A | * | 6/2000 | Stein | 219/432 |
| 6,121,585 A | | 9/2000 | Dam | |
| 6,140,614 A | * | 10/2000 | Padamsee | 219/438 |
| 6,192,787 B1 | * | 2/2001 | Montalto | 99/323.3 |
| 6,278,091 B1 | * | 8/2001 | Van Gooden | 219/528 |
| 6,310,329 B1 | * | 10/2001 | Carter | 219/432 |
| 6,353,211 B1 | * | 3/2002 | Chen | 219/527 |

* cited by examiner

BEVERAGE CONTAINER WARMER

This application claims benefit of Provisional Application 60/440,182, filed Jan. 14, 2003.

TECHNICAL FIELD OF THE INVENTION

This invention relates to a device for maintaining the temperature of a hot beverage in a container at the optimum temperature for drinking.

BACKGROUND

Many people purchase hot beverages "to go", such as coffee, café latte, tea, chai and similar drinks at coffee shops, convenience stores, espresso stands and the like. The hot beverages are generally provided in a plastic-coated cardboard container, generally with a plastic lid. Many purchasers prefer to drink their beverages at a leisurely pace while traveling in an automobile, commuting to work, or at work or home. Since such drinks may consist of 16 oz. or more in quantity, it is frequently desirable to consume them over a period of 30 minutes or more. The problem is that the beverages cool off fairly rapidly, and are no longer as desirable or satisfying as when originally purchased.

Styrofoam containers are occasionally used to serve hot beverages, and may provide some thermal insulation to retard cooling, but many hot-beverage aficionados believe the styrofoam imparts an unpleasant side-taste to the beverage. In addition, there is widespread and increasing resistance to the use of styrofoam on environmental grounds. Establishments catering to the serious hot-beverage consumers invariably use the plastic-coated cardboard containers.

There is a large variety of insulated containers available, and many people simply transfer their hot beverages from the ubiquitous cardboard containers to the insulated containers, and consume their beverage at their leisure. This can be quite effective in maintaining the beverage near the optimum temperature, but requires carrying the insulated container to the beverage shop, or having it available nearby. It also necessitates washing the insulated container out after use. The convenience of the cardboard container, which can be discarded after the beverage is consumed, is lost.

Also widely available are small hot-plates designed to keep beverages in a container at or near optimum drinking temperature. Such hot plates, which are designed for use on a desk or counter, work quite well with conventional metal, plastic or ceramic beverage containers, but are not very effective when used with the conventional "take-out" cardboard container; cardboard is a relatively poor heat-transfer substance, and the bottom of the beverage-containing part of the container is recessed inside the bottom of the container walls, and does not contact the heated surface of the hot plate.

Beverage containers with provisions for electrically heating the contained beverage are described by, for example, Dam, U.S. Pat. No. 6,121,585. An electrically heated beverage container designed to plug into an automobile cigarette lighter is marketed by The Johnson Smith Company, Bradenton, Fla. as their "Clever Cup", Item #51102. A container designed for infant milk or formula, in which the fluid can be heated by electrical or exothermic reaction, is taught by Teglbjarg, U.S. Pat. No. 6,123,065. Also known in the art are electrically heated devices for warming infant nursing bottles or food containers, such as the "Baby Bottle and Food Warmer", Item No. 09234, distributed by One Step Ahead/Leaps And Bounds Co., of Lake Bluff, Ill.; this device is essentially a small electrically heated water bath in which food or drink containers are partially immersed.

Beverage containers with provisions for heating the contained beverage by burning fuel or by mixing substances which react exothermically are taught by, for example, Pimm et al, U.S. Pat. No. 5,148,688 and Tenenboum et al, U.S. Pat. No. 6,267,110. A commercially available baby-bottle warmer utilizing an exothermic heating element is distributed by One Step Ahead/Leaps And Bounds Co., of Lake Bluff, Ill. as its "Reusable On-The-Go Bottle Warmer", Item No. 06918.

All of these aforementioned devices involve the use of a specialized container for the beverage, and none could be adapted for slip-on use with the plastic-coated cardboard hot-beverage containers in widespread use. A diligent search of the patent literature failed to identify any device which could be used as a slip-on warmer to keep a beverage in a disposable container warm.

A device which could slip over a cardboard hot-beverage container and maintain the beverage at the optimum temperature for consumption over extended periods, and which would slip off the container when empty, allowing the container to be discarded, would be very useful. Ideally, the device should be sufficiently thin so that, when slipped onto beverage-container it would not prevent the container plus device from fitting easily in automobile cup-holders or similar receptacles. The device should be compact, so that it could easily be stowed in a pocket or purse when not in use.

The present invention provides such a device.

OBJECTIVES AND SUMMARY OF THE INVENTION

It is an objective of the present invention to provide a device to maintain a hot beverage contained in a conventional plastic-coated cardboard hot-beverage container at optimum temperature for consumption over an extended period.

It is a further objective off the present invention to provide such a device which can be slipped onto a conventional cardboard hot-beverage container to maintain the hot beverage at optimum drinking temperature, and which can be slipped off the cardboard container when empty, allowing convenient disposal of the container and obviating the need to wash out a container.

It is a further objective of the present invention to provide such a device which can be used in a motor vehicle, and which will allow a container equipped with the device to fit in the cup-holder of the motor vehicle.

It is a further objective of the present invention to provide, in an alternative embodiment, such a device which can be used in a home or office.

It is a further objective of the present invention to provide, in a further alternative embodiment, such a device comprising a self-contained power source, so that it could be used outside, away from building or automobile power sources.

It is a still further objective of the present invention to provide, in a further alternative embodiment, convenient and economical means for replacement of a partially discharged battery with a recharged battery at a location convenient to the point-of-sale of a hot beverage.

To accomplish these objectives, the present invention comprises a thin, flexible heating pad which can be fixed into a form which slips over the outside of a conventional plastic-coated cardboard hot-beverage container. Electrical power sufficient to maintain the beverage at the desired temperature is supplied, in various embodiments, by an automobile cigarette-lighter adapter, by a 110 VAC outlet, or by self-contained batteries, which may be rechargeable and/or disconnectable and replaceable. When not in use, the device can be flattened so as to fit conveniently in a pocket, purse, backpack or briefcase.

DETAILED DESCRIPTION OF THE INVENTION

The beverage container warmer of the present invention comprises an electrically heatable sleeve or heating jacket into which a disposable hot-beverage container fits snugly. In preferred embodiments, the sleeve is flexible, and comprises a flexible inner layer for contacting the beverage container; flexible electrical heating means disposed across the inner layer, flexible thermally-resistant electrical insulating material enclosing the electrical heating means, and a flexible thermally-insulating outer layer, and mating attachment means at each end of the device for detachably or permanently attaching the ends together to form the device into a shape to fit over commonly used cardboard disposable hot-beverage container. The beverage container warmer may comprise, in various embodiments, connector means for detachably connecting the electrical heating means to a power source, or batteries or similar energy storage means, which may be detachable from the body of the container warmer. The invention may also comprise, in alternative embodiments, means for replacing a discharged battery with a recharged battery at a location convenient to the point-of-sale of a hot beverage. The invention may also comprise, in further alternative embodiments, motor vehicle container holders comprising connector means to supply electrical power from the motor vehicle to the container warmer.

Figure 1A:
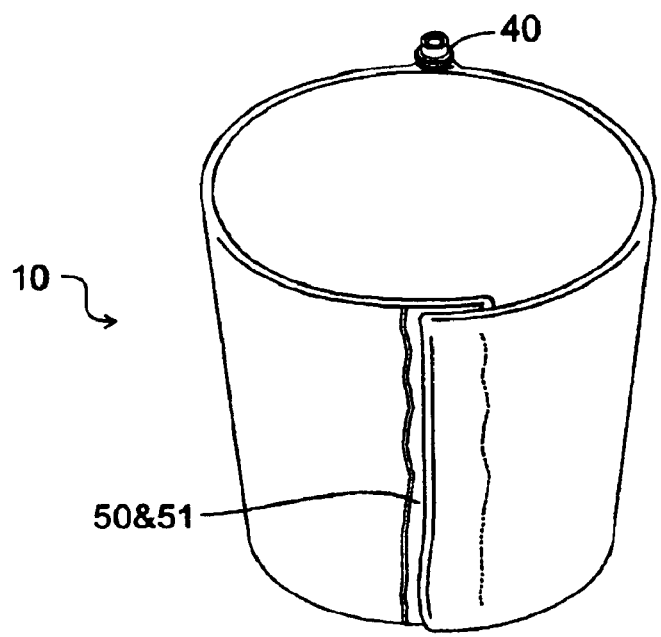
FIG. 1a is a sketch of a preferred embodiment of the beverage container warmer of the present invention in the set up configuration, ready to be slipped onto a beverage container.
Figure 1B:
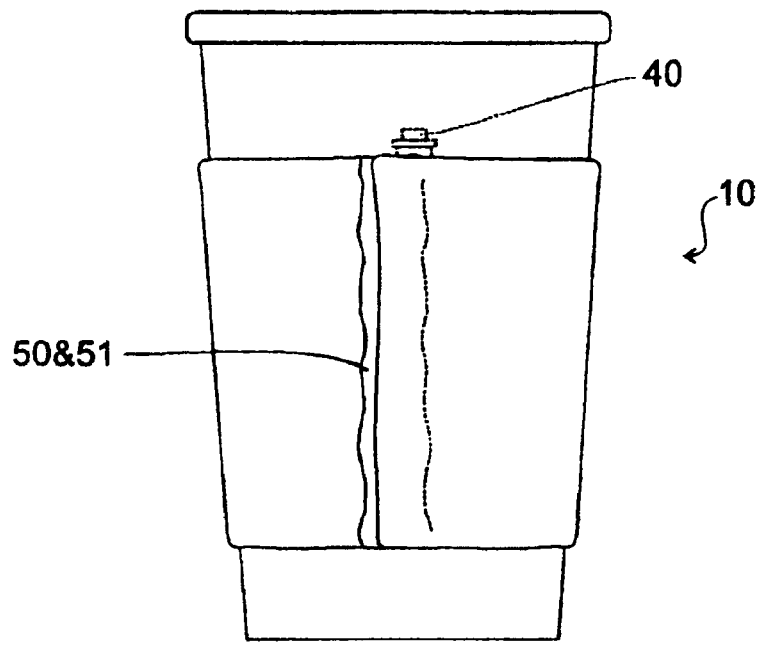
FIG. 1b is a sketch of the preferred embodiment of the beverage container warmer of the present invention with a beverage container inserted.
Figure 2:
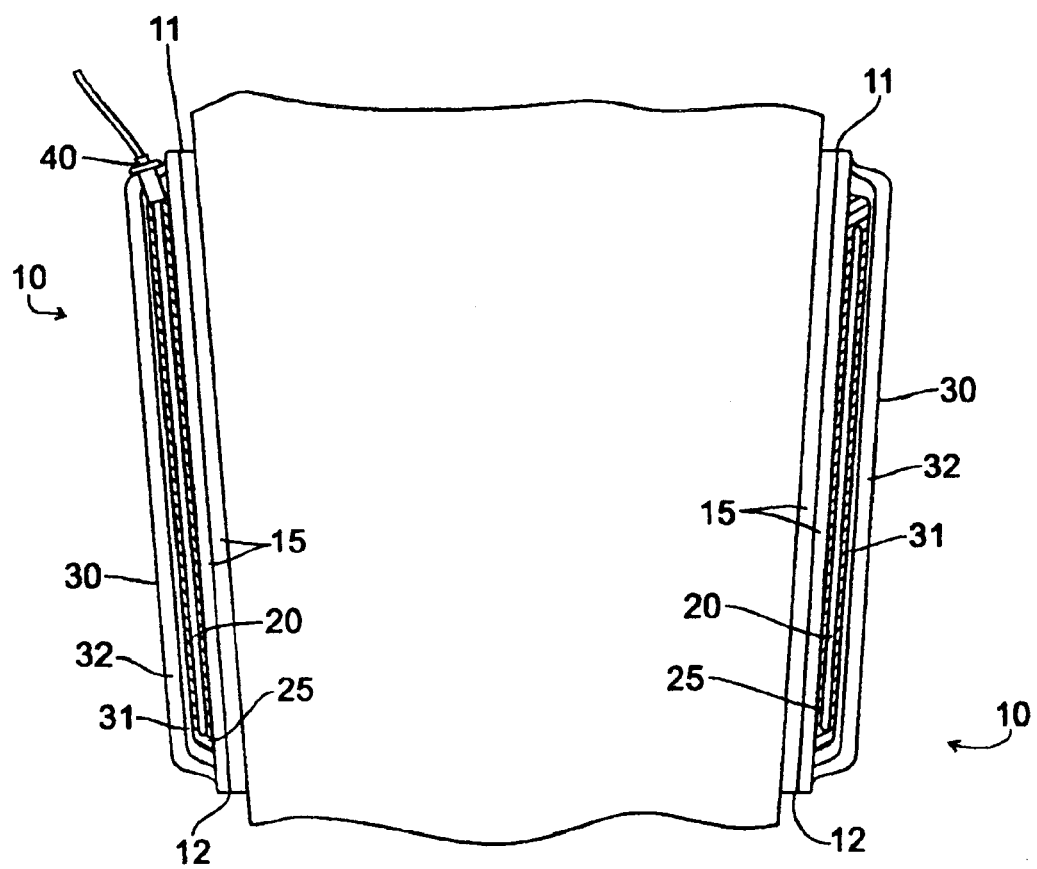
FIG. 2 shows a radial cross-section of a beverage container with the preferred embodiment of the beverage container warmer of the present invention in place.
Figure 3:
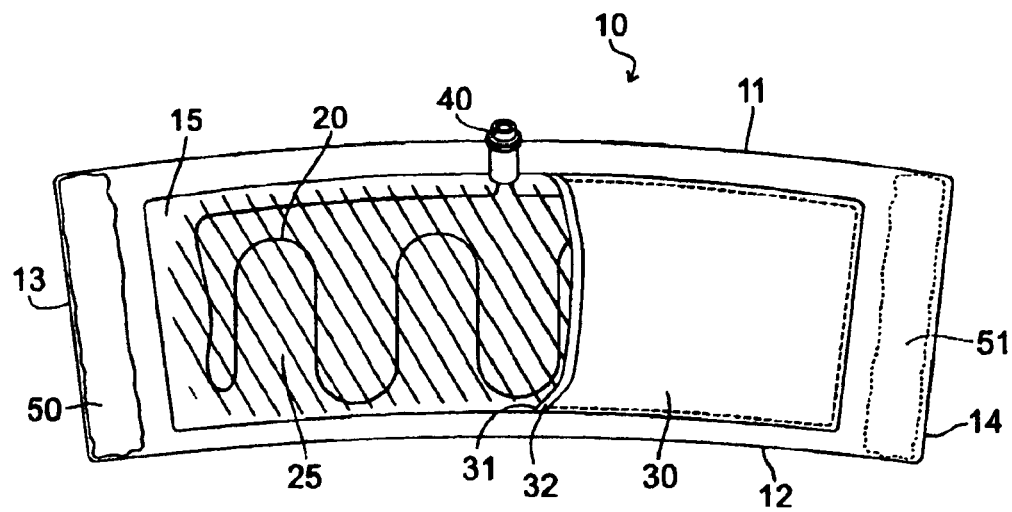
FIG. 3 is a sketch of a preferred embodiment of the beverage container warmer of the present invention in the flat configuration, seen from the outside (i.e., the side farthest from the beverage container), and partially cut away to show details of the construction of the device.

FIGS. 1, 2 and 3 show a preferred embodiment of the container warmer of the present invention, 10, which has an upper edge 11, a lower edge 12, and ends 13 and 14. Flexible inner layer 15 is comprised of heat-resistant fabric, most preferably two layers of Nomex Fabric with Kevlar, 7.5 oz., black, obtained from Southern Mills, Union City, Ga. Electrical heating means 20 may preferably comprise approximately 26 inches of 28 ga. Nichrome Ni—Cr A wire, obtained from Wiretronic Inc. of Pine Grove, Calif., encased in flexible thermally-resistant electrical insulating material 25, most preferably General Electric RTV6126 silicone elastomer, obtainable from GE Silicones, Waterford, N.Y. (RTV6126 is a two-part silicone gel which is flexible, stretchable and elastic when cured, and heat resistant to 400° F.) Flexible thermally-insulating outer layer 30 comprises, in the most preferable embodiment a further layer 31 of Nomex Fabric with Kevlar, 7.5 oz., black and an outermost layer 32 of Neoprene, obtainable from Seattle Fabric, Seattle, Wash. The layers comprising the container warmer 10 may be fastened together by cementing, stapling, or any attachment means known to the art; in the most preferable embodiment, the layers are fastened together by stitching with Nomex thread obtainable from Atlantic Thread Co., Seattle, Wash.

In the most preferred embodiment, heating means 20 will comprise a custom fabricated thick-film resistance heating element encased in silicone rubber, obtainable from Chromalox®, Inc. of Pittsburgh Pa. and similar to Chromalox® Model No. SL-N-1-10-O-10-120V-50W, with dimensions to conform to container warmer 10, and electrical resistance of the thick film heating element about 8.5 ohms.

This most preferred embodiment comprises electrical connector means 40 for detachably connecting electrical heating wire 20 to a power source, which may be any conventional two-conductor receptacle. Preferably, connector 40 will be Radio Shack Part 270-1533. Any commercially available adapter cord, such as Radio Shack 270-1594, having a plug on one end mating with connector 40 and a plug on the other end to mate with an automobile cigarette lighter, may be used to connect the container warmer off the present invention to an automobile 12 V DC power supply.

Mating attachment means 50 and 51 at each end of container warmer, to detachably attach ends 13 and 14 together, may be a zipper, hook-and-loop strips, snaps, or any detachable attachment means known to the art. In the most preferred embodiment, attachment means 50 and 51 comprise hook and loop material such as Velcro™ hook HTH 830 and loop 3905. The hook and loop material is attached to the body of the container warmer by stitching with Nomex thread.

In an alternative embodiment, mating attachment means 50 and 51 at ends 13 and 14 may comprise tabs which could be permanently attached, by, for example, cementing or sewing with Nomex thread. The flexibility of the container warmer of the present invention will allow it to be flattened into a compact form for stowage when not in use.

In the most preferred embodiment, the upper and lower margins 11 and 12, respectively, of the container warmer will be curved, and ends 13 and 14 will be at a slight angle converging toward the bottom 12, as illustrated in FIG. 3, so that container warmer 10 will form an approximate frustum of a cone when the halves of the hook-and-loop or other attachment means are attached, as shown in FIG. 1a. Most hot-beverage containers currently in use are frustra of cones, and the container warmer of the present invention will make a snug, heat-transfer-efficient fit on such containers. One skilled in the art can readily determine the needed degree of curvature and converging angle without undue experimentation.

The container warmer of the present invention will draw about 1.4 amps from a 12 V source, so it will not unduly load an automobile electrical system. It will maintain the contents of a large hot-beverage container at about 160° F., which is generally considered to be the optimum drinking temperature.

In the preferred flexible embodiments of the container warmer of the present invention, an exact match to the taper of the beverage container is not necessary; the flexibility of the container warmer can accommodate a slight mismatch and still establish sufficient contact for efficient heat-transfer to the beverage container.

The flexibility of preferred embodiments of the container warmer of the present invention also allows the device to be used on hot-beverage containers of different capacities. The hot-beverage containers of different capacity in common use ("Tall"—14 oz., "Grande"—17 oz., "Venti"—22 oz.) actually vary relatively little in their top diameter or their bottom diameter; the difference in capacity is due mainly to the height of the container. The container warmer of the present invention could easily fit any of these most commonly used hot-beverage container sizes.

The container warmer of the present invention will also fit most styrofoam containers in common use for hot beverages. Heat transfer to the hot beverage will not be as efficient as with the thinner-wall cardboard container, but the container warmer will maintain the beverage temperature at a satisfactory drinking temperature for an extended period.

In an alternative embodiment of the container warmer of the present invention, a replaceable fuse or fusible link could be incorporated in the electrical heating means 20, to afford protection against electrical failure or operation at an incorrect voltage. As a further alternative embodiment, a thermal cut-out switch could be incorporated, to interrupt the electrical heating circuit if a preset temperature is exceeded in the container warmer.

In another alternative embodiment of the container warmer of the present invention, a thermostatic switch could be incorporated in the electrical heating means 20, to maintain the temperature at the optimum point regardless of ambient temperature variations.

In a further alternative embodiment of the present invention, electrical heating means 20 and connector 40 could be modified to allow the container warmer to operate at 110 VAC, so that the device could be used in a home or office environment. One skilled in the art could readily determine the proper length and gauge of electrical heating wire to provide the same heating power (approx. 16 watts) as provided in the more preferred embodiments.

In a still further alternative embodiment, the container warmer designed for 12 VDC could be provided with a compact 110 VAC to 12 VDC (or 12 VAC, since the electrical load is virtually purely resistive) power converter.

In either of the latter two embodiments, the electrical power supply would be equipped with a connector capable of mating with connector 40 (FIGS. 2 and 3).

In an alternative embodiment, electrical connector means could be comprised in a container holder in a motor vehicle which would make electrical contact with mating connector means comprised within the container warmer when the container warmer was inserted in the cup holder. Such connector means could provide that rotating the container warmer would engage the container warmer with suitable engagement means in the cup holder. Devising suitable engagement means and electrical connector means would be well within the purview of one skilled in the art. Exemplary engagement and connector means will be disclosed below.

Figure 4:
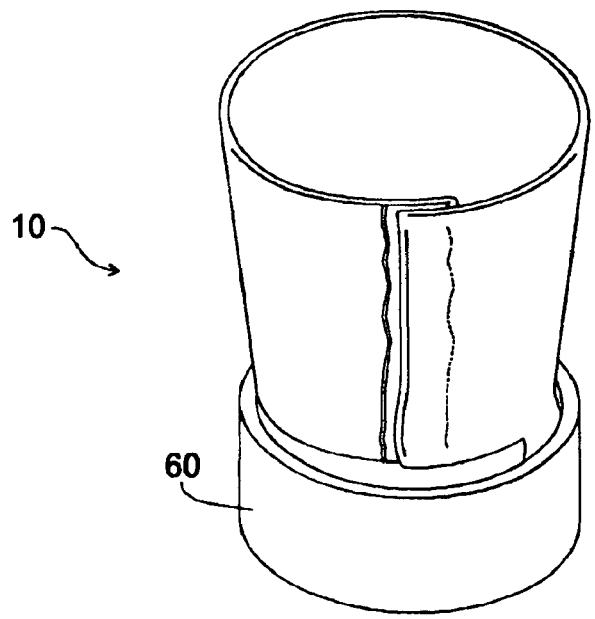
FIG. 4 shows an alternative embodiment of the beverage container warmer comprising a battery unit at the base of the device.

In still further embodiments, the container warmer of the present invention could be equipped with a battery, so the container warmer could be used away from any external power source. In one such embodiment, illustrated in FIG. 4, the battery would be enclosed in a battery unit 60, which could, for example, form a bottom of the container warmer 10. In alternative embodiments, a flat, flexible battery could be incorporated as an additional layer in the container warmer, or one or a plurality of compact batteries, such as the commonly available AAA batteries or batteries similar to those used in cell phones, could be incorporated within the layers of preferred embodiments such as the one illustrated in FIGS. 1, 2 and 3.

Preferably, in embodiments equipped with batteries, the batteries would be rechargeable, and could be recharged any time an electrical source was available. If desired, the battery-equipped container warmer could contain a switch to select between "Heat" and "Recharge" modes, to allow use of external electrical power when available to maintain the hot beverage at the desired temperature. Alternately, the battery-equipped container warmer could contain an On-Off switch for the heater, in embodiments where the container warmer would be continually recharging when connected to the external power source.

Figure 5:
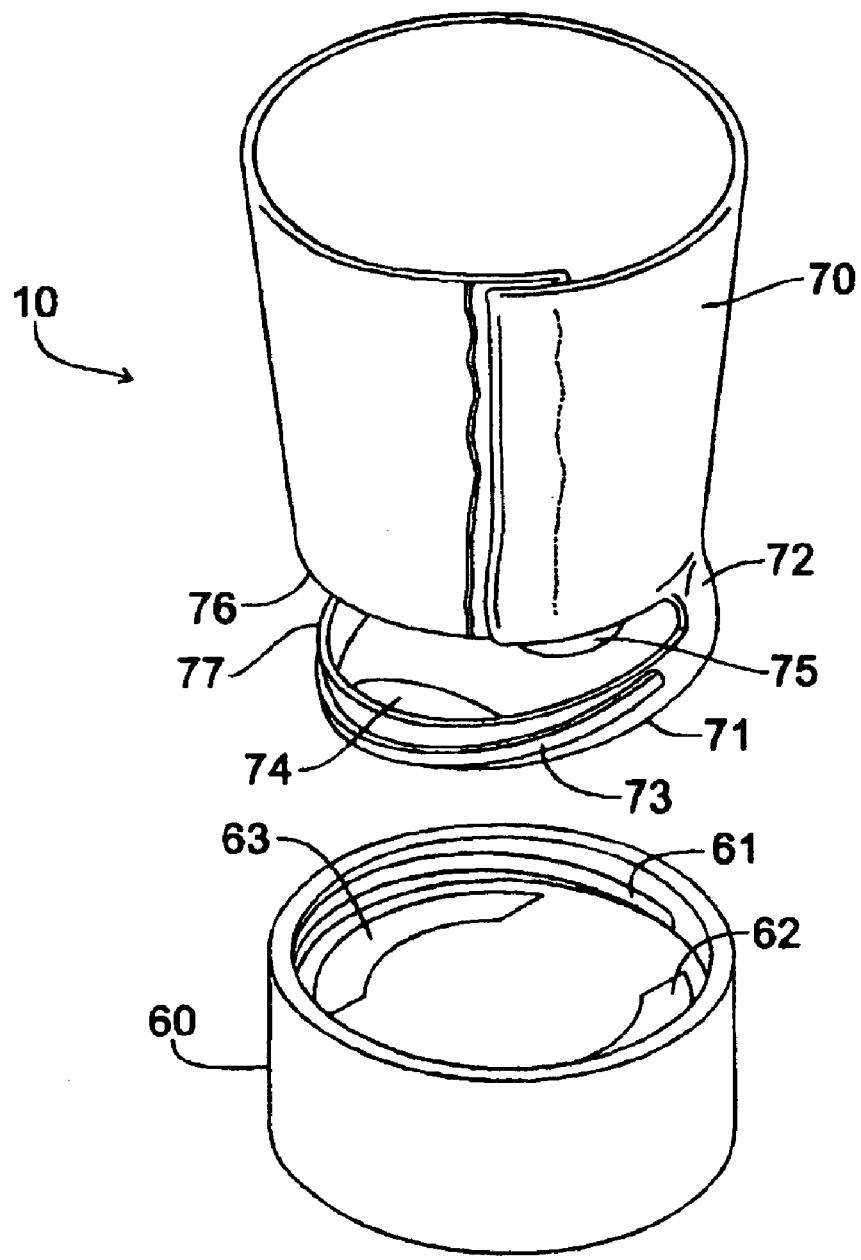
FIG. 5 shows an alternate embodiment with a detachable battery unit.

In further alternative embodiments of embodiments of the container warmer of the present invention comprising batteries in a separable unit, the battery unit would preferably be detachably attached and electrically disconnectably connected to the heating jacket of the container warmer, so that it could be removed from the heating jacket and connected to a suitable battery recharging unit. One such embodiment is illustrated in FIG. 5, where heating jacket 70 is attached to contact ring 71 by flexible hinge 72. Contact ring 71 would preferably be constructed of plastic. Contact ring 71 could have a screw thread such as 73 with which to engage mating screw thread 61 on battery unit 60. Battery unit 60 would have electrical contacts such as 62 and 63, which would make electrical contact with contacts 74 and 75 on the bottom of contact ring 71 when battery 60 is rotated to engage it firmly in contact ring 71. Preferably, screw threads 73 and 61 would operate to connect battery unit 60 firmly to contact ring 71 and make electrical contact with contacts 64 and 65, with a partial turn, preferably about a quarter turn. Electrical connections between contacts 74 and 75 and the electrical heating means in the heating jacket would comprise flexible connectors enclosed in flexible hinge 72. Preferably, the lower edge 76 of heating jacket 70, and the top 77 of contact ring 71 would comprise mating connection means, more preferably hook and loop material such as Velcro™ HTH 830 hook and 3905 loop, to firmly detachably attach heating jacket 70 to contact ring 71. When not in use, battery unit 60 could be disconnected from contact ring 71, mating attachment means 50 and 51 and mating means 76 and 77 could be disconnected, and the device could be flattened out and partially folded into a compact form for stowage, for example in a pocket or purse.

The design and fabrication of a suitable recharging unit would be within the purview of one skilled in the art. Extra battery units could be provided, so that a user of the container warmer of the present invention could always have a fully charged battery available whenever the user wished to obtain a hot beverage.

In a further alternative embodiment of embodiments of the present invention comprising a detachably attached and electrically disconnectably connected battery unit, a battery-exchange station incorporating recharging means could be provided in establishments providing hot beverages, such that a user of the container warmer of the present invention would deposit a partially or fully discharged battery unit in the station and receive in exchange a fully recharged battery unit. Such an exchange station could be somewhat similar to a vending machine, but with the additional step of inserting the discharged battery unit in the machine to get a fully recharged unit. An additional fee might be charged for such battery exchange, or the cost associated with the battery-exchange station could be recovered in the purchase price of the hot beverage. Design and fabrication of such a battery-exchange station is well within the purview of one skilled in the art.

Figure 6:
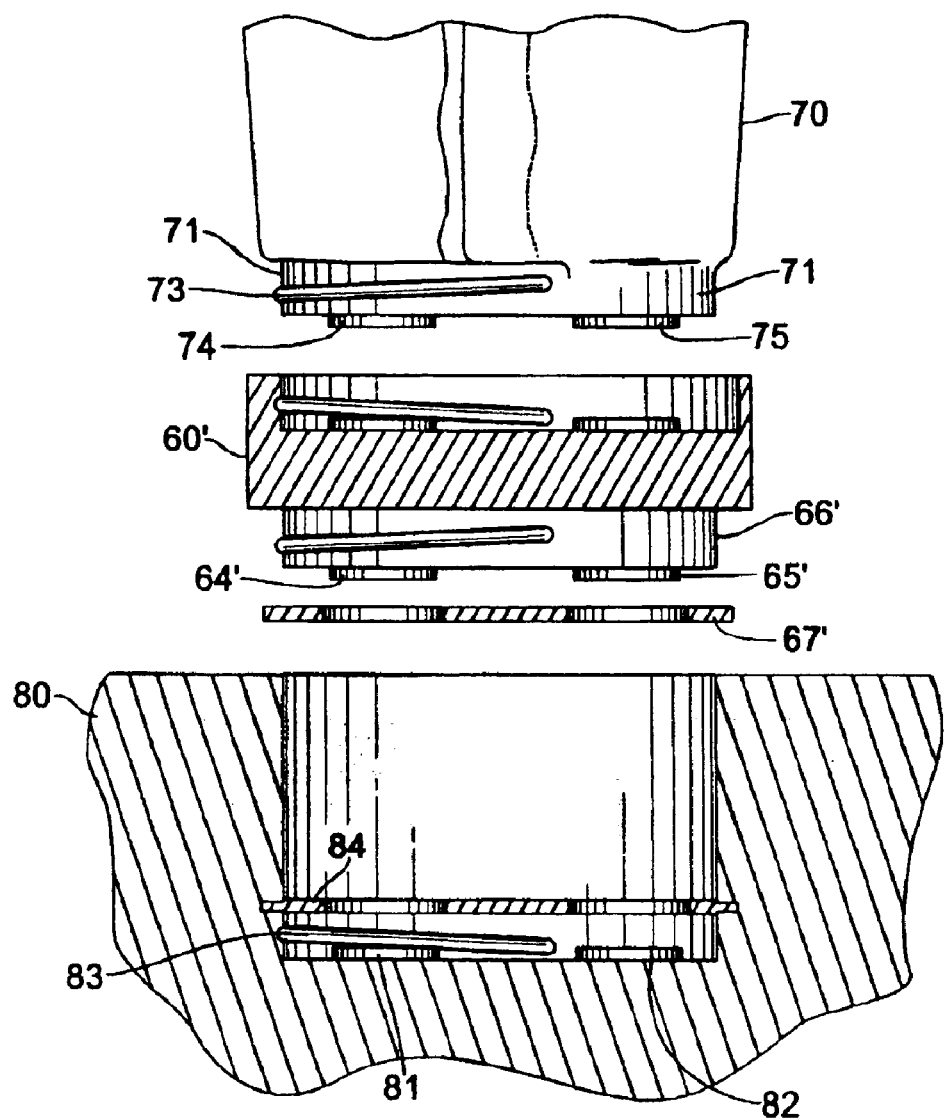
FIG. 6 shows a further alternate embodiment for use in a motor vehicle cup holder, and details of such a cup holder.

In a still further alternative embodiment of the container warmer of the present invention, a motor vehicle cup-holder could be provided for incorporation in motor vehicles either as original equipment or, alternately, for later installation, which cup holder could accommodate the container warmer of the present invention, and comprise means to supply electric power to the container warmer, and also to recharge the battery if the container warmer comprises a rechargeable battery. Such a cup holder is illustrated schematically as 80 in FIG. 6. A battery unit such as 60' could be equipped with a second set of electrical contacts 64' and 65' on the sides or bottom of the unit which would make electrical contact with mating contacts 81 and 82 comprised in motor vehicle cup holder 80 and electrically connected to the motor vehicle's electrical system. Battery 60' could comprise an additional threaded section 66', and the cup holder could comprise mating threads 83 such that inserting container warmer into the cup holder and rotating it would engage and lock the container warmer into the cup holder and bring electrical contacts on the battery unit into contact and electrical connection with the mating contacts in the cup holder. Preferably, battery unit 60' for such embodiments would comprise a cover 67' for the second set of contacts 64' and 65' such that rotating the container warmer to make electrical contact with the contacts 81 and 82 in the cup holder would displace such cover against the restoring force of a return spring. Similarly, cup holder 80 could be equipped with a similar cover 84 which would similarly be displaced against the restoring force of a return spring when the container warmer were rotated to engage it in the cup holder. Equipping one of the covers with a key and the other with a corresponding notch would assist in displacing the covers when container warmer 10 were rotated and engaged in cup holder 80. The details of such threads, contacts and return springs could be readily determined by one skilled in the art. Such covers would protect against the minimal hazard of the user contacting live electrical contacts 64', 65', 81, or 82.

This latter embodiment would have the advantage of using the motor vehicle's electrical system to keep the hot beverage at optimum temperature for consumption, and keeping the battery unit fully charged, while the user is in the motor vehicle, while at the same time affording portability, allowing the user to take the container warmer out of the motor vehicle and still maintain proper beverage temperature.

It would be possible, as a further alternative embodiment, to utilize threaded engagement and locking means and electrical contact means such as those described immediately above with a beverage warmer comprising a rechargeable battery which was not disconnectable from the heating jacket.

In a still further alternative embodiment of the container warmer of the present invention, a motor vehicle cup holder could be provided for incorporation in motor vehicles either as original equipment or, alternately, for later installation, which would comprise electrical heating means in the cup holder, so the cup holder would also function as a container warmer. Preferably, a switch would be provided in such a cup holder to activate or deactivate the electrical heating means as desired.

In another alternative embodiment, the container warmer of the present invention could be fabricated in the form of a container holder detachably attached to a portable computer, and comprising electrical heating means powered by the portable computer's battery or line-voltage power. Such embodiment would provide the advantage of keeping the computer user's hot beverage at optimum temperature while using the computer in airports, airplanes, busses or trains, etc.

Many of the embodiments described above incorporate batteries as sources of electric power. The inventors of the present invention are aware that miniature fuel cells are currently under development which could conceivably replace batteries at some time in the future in many applications requiring stored electric power. The present invention contemplates the use of such miniature fuel cells as an alternate for batteries to supply the necessary electric power to operate the container warmer of the present invention.

Other embodiments will be apparent to one skilled in the art, which will change various details of the present invention without limiting its scope. Furthermore, the foregoing description of the preferred embodiment of the invention and the best mode for practicing the invention are provided for the purpose of illustration only and not for the purpose of limitation of the invention, which will be defined by the claims.

What is claimed is:

1. A device for keeping a hot beverage, contained in a container having the shape of the frustum of a cone, at the desired elevated temperature for consumption, comprising:
   a flexible heating jacket having the shape of a frustum of a cone into which said container can be inserted such that said jacket substantially surrounds and contacts at least a portion of said container, said flexible heating jacket being capable of being transformed into a substantially flattened configuration when not enclosing said container;
   electrically powered heating means embedded in said heating jacket; and
   means for supplying electric power to said heating jacket.

2. The device of claim 1 wherein the heating jacket comprises:
   a flexible inner layer for contacting the beverage cup;
   flexible electrical heating means disposed across the inner layer;
   disconnectable electrical connector means for supplying electric power to said heating jacket;
   flexible thermally-resistant electrical insulating material enclosing the electrical heating means; and
   a flexible thermally-insulating outer layer.

3. The device of claim 2 wherein the disconnectable electrical connector means for supplying electric power to said heating jacket comprise an electrical cord with an adapter at one end which can plug into and make electrical contact with an motor vehicle cigarette lighter, and an adapter at the other end which can plug into and make electrical contact with a mating connector comprised in the heating jacket.

4. The device of claim 2 wherein the disconnectable electrical connector means for supplying electric power to said heating jacket comprise an electrical adapter which can be plugged into and make electrical contact with standard 110/120 VAC electrical outlet with an electric cord terminating in and in electrical contact with an adapter at the other end which can plug into and make electrical contact with a mating connector comprised in the heating jacket.

5. The device of claim 4 wherein the electrical adapter which can be plugged into and make electrical contact with standard 110/120 VAC electrical outlet comprises a step-down transformer to reduce the voltage supplied to the cup warmer.

6. The device of claim 1 wherein the means for supplying electric power to the heating jacket comprise batteries.

7. The device of claim 6 wherein the batteries are rechargeable.

8. The device of claim 1 wherein the beating jacket comprises:
   a flexible inner layer for contacting the beverage cup;
   flexible electrical heating means disposed across the inner layer;
   batteries to supply electric power to said heating jacket;
   flexible thermally-resistant electrical insulating material enclosing the electrical heating means;
   a flexible thermally-insulating outer layer.

9. The device of claim 8 wherein the batteries are rechargeable.

10. The device of claim 6 wherein the batteries are contained in a battery holder detachably attached and disconnectably connected electrically to the heating jacket.

11. The device of claim 9 comprising disconnectable electrical connection means to provide electrical power to the heating jacket, and to recharge said rechargeable batteries, comprised in a cup holder for permanent installation as an integral component of a motor vehicle.

12. The device of claim 9 comprising disconnectable electrical connection means to provide electrical power to the heating jacket, and to recharge said rechargeable batteries, comprised in a cup holder for permanent installation in a motor vehicle.

13. The device of claim 10 comprising disconnectable electrical connection means to provide electrical power to the heating jacket and to recharge said rechargeable batteries comprised in a cup holder for permanent installation as an integral component of a motor vehicle.

14. The device of claim 1 wherein said flexible heating jacket comprises a substantially flat structure having upper and lower edges and lateral edges, wherein said upper and lower edges have the shape of sectors of concentric circles and said lateral edges have the shape of radii of said concentric circles, and wherein said heating jacket additionally comprises detachable attachment means such that said lateral edges may be detachably attached or overlapped so that said heating jacket forms a frustum of a cone.

15. The heating jacket of claim 5 wherein said electrical adapter further comprises a rectifier such that the adapter provides a DC supply to said heating jacket at the same voltage and polarity as would be provided by an automotive vehicle electrical supply.

16. The heating jacket of claim 2 wherein said disconnectable electrical connector means comprise an electrically polarized connector which can be disconnectably connected to a mating connector comprised in said heating jacket.

17. The device of claim 8 wherein said batteries comprise thin, flexible rechargeable batteries disposed across the exterior of said flexible thermally-resistant electrical insulating material enclosing said electrical heating means.

18. The device of claim 6 wherein said batteries are contained in a battery holder which is flexibly attached to said heating jacket at at least one point and is detachably attached to said heating jacket at at least one other point, such that said battery holder can be detached from the at least one other point and folded flat when said heating jacket is transformed into a substantially flattened configuration.

19. The device of claim 18 comprising disconnectable electrical connection means to provide electrical power to the heating jacket and to recharge said rechargeable batteries comprised in a cup holder for permanent installation in a motor vehicle.

20. A method of keeping a hot beverage, contained in a container having the shape of the frustum of a cone, at the desired elevated temperature for consumption, comprising:
   providing a flexible electrically heated jacket having the shape of a frustum of a cone into which said container can be inserted such that said jacket substantially surrounds and contacts at least a portion of said container, said flexible heating jacket being capable of being transformed into a substantially flattened configuration when not enclosing said container, wherein the electrical power for said heating jacket is provided by a rechargeable battery contained in a battery holder detachably attached and disconnectably connected electrically to the heating jacket;
   providing a battery dispensing machine into which a partially discharged battery in its holder can be inserted and which will in turn dispense a fully recharged battery in its holder.

21. The method of claim 20 wherein the hot beverage is provided at a commercial establishment, and the battery dispensing machine is provided at said establishment.

22. A cup holder for permanent installation as an integral component of a motor vehicle comprising means for keeping a hot beverage in a container at the desired elevated temperature for consumption, comprising:
   a cavity into which said beverage container can be inserted;
   electrically powered heating means embedded in the walls of said cavity;
   means for supplying electric power to said heating means; and
   a switch controlling the application of electric power to said heating means.

23. The cup holder of claim 22 in which said cavity has the shape of a frustum of a cone.

24. The cup holder of claim 22 in which said cavity comprises flexible walls.

25. A device detachably connectable to a computer for keeping a hot beverage, contained in a container having the shape of the frustum of a cone, at the desired elevated temperature for consumption, comprising:
   a flexible heating jacket having the shape of a frustum of a cone into which said container can be inserted such that said jacket substantially surrounds and contacts at least a portion of said container, said flexible heating jacket being capable of being transformed into a substantially flattened configuration when not enclosing said container;
   electrically powered heating means embedded in said heating jacket; and
   means for supplying electric power to said heating jacket.

26. The device of claim 25 in which said means for supplying electric power to said heating jacket comprise an electrical adapter which can be plugged into and make electrical contact with standard 110/120 VAC electrical outlet with an electric cord terminating in and in electrical contact with an adapter at the other end which can plug into and make electrical contact with a mating connector comprised in the heating jacket.

27. The device of claim 26 wherein the electrical adapter which can be plugged into and make electrical contact with standard 110/120 VAC electrical outlet comprises a step-down transformer to reduce the voltage supplied to the cup warmer.

28. The device of claim 25 in which said means for supplying electric power to said heating jacket comprise an electrical adapter which can be plugged into and make electrical contact with a mating connector capable of supplying power from said computer.

* * * * *

(12) EX PARTE REEXAMINATION CERTIFICATE (6162nd)
United States Patent
Hamm et al.

(10) Number: US 6,870,135 C1
(45) Certificate Issued: Mar. 25, 2008

(54) BEVERAGE CONTAINER WARMER

(75) Inventors: Andrew J. Hamm, Seattle, WA (US); Cody Lord, Seattle, WA (US); Steve Clark, Seattle, WA (US)

(73) Assignee: HLC Efficiency Products LLC, Seattle, WA (US)

Reexamination Request:
No. 90/007,795, Nov. 4, 2005

Reexamination Certificate for:
Patent No.: 6,870,135
Issued: Mar. 22, 2005
Appl. No.: 10/754,786
Filed: Jan. 8, 2004

Related U.S. Application Data

(60) Provisional application No. 60/440,182, filed on Jan. 14, 2003.

(51) Int. Cl.
*A23L 1/00* (2006.01)
*A47J 36/24* (2006.01)
*A47J 36/26* (2006.01)

(52) U.S. Cl. .............. 219/386; 219/202; 219/387; 219/432; 219/433

(58) Field of Classification Search ............ 219/385, 219/386, 201, 202, 429, 432, 433, 528, 529, 219/387, 549
See application file for complete search history.

(56) References Cited

U.S. PATENT DOCUMENTS

| | | | |
|---|---|---|---|
| 2,518,538 A | 8/1950 | Giblin | |
| 2,541,218 A | 2/1951 | Doerr | |
| 3,079,486 A | * 2/1963 | Wincheil | 219/528 |
| 3,296,415 A | 1/1967 | Eisler | |
| 3,405,899 A | 10/1968 | Trachtenberg | |
| 3,432,641 A | 3/1969 | Welke | |
| 3,931,494 A | 1/1976 | Fisher et al. | |
| 4,065,660 A | 12/1977 | Berard | |
| 4,463,664 A | 8/1984 | Peace | |
| 4,833,299 A | 5/1989 | Estes | |
| 4,914,920 A | 4/1990 | Carnegie et al. | |
| 5,208,896 A | 5/1993 | Katayev | |
| 5,283,420 A | 2/1994 | Montalto | |
| 5,436,429 A | * 7/1995 | Cline | 219/202 |
| 6,054,691 A | 4/2000 | McGwire | |
| 6,060,700 A | 5/2000 | Perlman | |
| 6,072,161 A | * 6/2000 | Stein | 219/432 |
| 6,082,114 A | 7/2000 | Leonoff | |
| 6,121,585 A | 9/2000 | Dam | |
| 6,192,787 B1 | 2/2001 | Montalto | |
| 6,282,906 B1 | 9/2001 | Cauchy | |
| 6,530,232 B1 | 3/2003 | Kitchens | |
| 2004/0068992 A1 | 4/2004 | Cauchy | |

OTHER PUBLICATIONS

Johnson Smith Company "Smart Mug", CleverGear web-site catalog, URL http://www.clevergear.com/website/store/product_detail.asp?UID=2004032819272591&item_no=51102&keyword=cauto&cat_keyword=cauto&search_page_no=3.

AUTOSPORT"Heated Travel Mug", AutoSport web-site catalog URL http://www.autosportcatalog.com/index.cfm?fa=p&pid=565.

* cited by examiner

*Primary Examiner*—Sara S Clarke

(57) ABSTRACT

The invention provides an electrically heated jacket to maintain a hot beverage contained in a disposable hot-beverage container at optimum temperature for consumption. Electrical power for heating may be provided, in various embodiments, by household electric power, electric power from a motor vehicle electrical system, or batteries, which may be disposable or rechargeable. The invention also provides a method for keeping a hot beverage warm comprising providing freshly recharged batteries convenient to the point-of-sale of hot beverages.

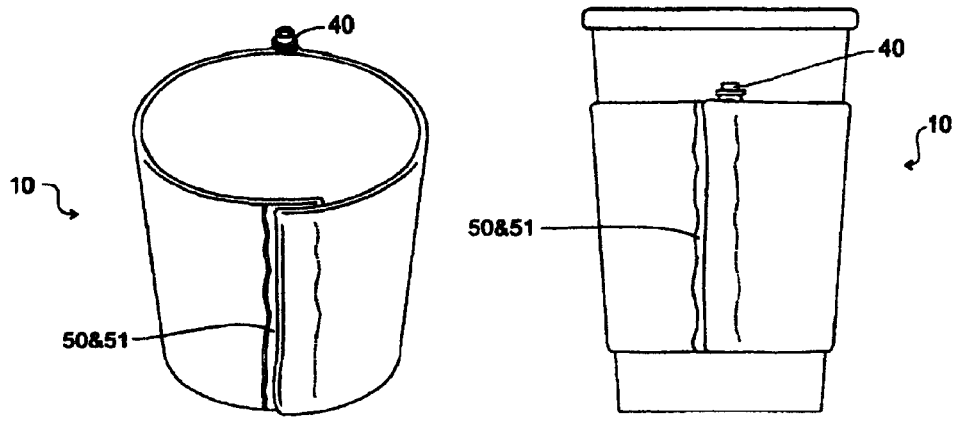

US 6,870,135 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 14 and 16 are cancelled.

Claims 1, 8, 11–13, 19, 20, 22 and 25 are determined to be patentable as amended.

Claims 2–7, 9, 10, 15, 17, 18, 21, 23, 24 and 26–28, dependent on an amended claim, are determined to be patentable.

New claims 29–40 are added and determined to be patentable.

1. A device for keeping a hot beverage, contained in a container having the shape of the frustum of a cone, at the desired elevated temperature for consumption, *said device* comprising:
  a flexible heating jacket having the shape of a frustum of a cone into which said container can be inserted such that said jacket substantially surrounds and contacts at least a portion of *a curved surface of* said container, said flexible heating jacket being capable of being transformed into a substantially flattened configuration when not enclosing said container, *wherein said flexible heating jacket comprises a substantially flat structure having upper and lower edges and lateral edges, wherein said upper and lower edges have the shape of sectors of concentric circles and said lateral edges have the shape of radii of said concentric circles, and wherein said heating jacket additionally comprises detachable attachment means such that said lateral edges may be detachably attached or overlapped so that said heating jacket forms a frustum of a cone*;
  electrically powered heating means embedded in said heating jacket; and
  means for supplying electric power to said heating jacket.

8. The device of claim 1 wherein the [beating] *heating* jacket comprises:
  a flexible inner layer for contacting the beverage cup;
  flexible electrical heating means disposed across the inner layer;
  batteries to supply electric power to said heating jacket; *and*
  flexible thermally-resistant electrical insulating material enclosing the electrical heating means;
  a flexible thermally-insulating outer layer.

11. The device of claim 9 [comprising] *comprised in a cup holder permanently installed as an integral component of a motor vehicle, wherein said device comprises* disconnectable electrical connection means to provide electrical power to the heating jacket, and to recharge said rechargeable batteries[, comprised in a cup holder for permanent installation as an integral component of a motor vehicle].

12. The device of claim 9 [comprising] *comprised in a cup holder permanently installed as an integral component of a motor vehicle, wherein said device comprises* disconnectable electrical connection means to provide electrical power to the heating jacket, and to recharge said rechargeable batteries[, comprised in a cup holder for permanent installation in a motor vehicle].

13. The device of claim 10 [comprising] *comprised in a cup holder permanently installed as an integral component of a motor vehicle, wherein said device comprises* disconnectable electrical connection means to provide electrical power to the heating jacket, and to recharge [said] rechargeable batteries comprised [in a cup holder for permanent installation as an integral component of a motor vehicle] *therein*.

19. The device of claim 18 [comprising] *comprised in a cup holder permanently installed as an integral component of a motor vehicle, wherein said device comprises* disconnectable electrical connection means to provide electrical power to the heating jacket and to recharge [said] rechargeable batteries [comprised in a cup holder for permanent installation in a motor vehicle] *therein*.

20. A method of keeping a hot beverage, contained in a container having the shape of the frustum of a cone, *said container having a closed bottom at the small end of the frustum and a top at the large end of the frustum, which top can be open, covered with a removable lid, or covered with a removable lid comprising an opening to permit drinking of the beverage,* at the desired elevated temperature for consumption, *said method* comprising:
  providing a flexible electrically heated jacket having the shape of a frustum of a cone into which said container can be inserted such that said jacket substantially surrounds and contacts at least a portion of *a curved surface of* said container, said flexible heating jacket being capable of being transformed into a substantially flattened configuration when not enclosing said container, wherein the electrical power for said heating jacket is provided by a rechargeable battery contained in a battery holder detachably attached and disconnectably connected electrically to the heating jacket; *and*
  providing a battery dispensing machine into which a partially discharged battery in its holder can be inserted and which will in turn dispense a fully recharged battery in its holder.

22. A [cup holder for permanent installation as an integral component of a] motor vehicle comprising *a cup holder permanently installed therein comprising* means for keeping a hot beverage in a container at the desired elevated temperature for consumption, comprising:
  a cavity into which said beverage container can be inserted;
  electrically powered *resistive* heating means embedded in the walls of said cavity;
  means for supplying electric power to said heating means; and
  a switch controlling the application of electric power to said heating means.

25. A *computer comprising a* device [detachably connectable to a computer] *disconnectably connected thereto* for keeping a hot beverage, contained in a container having the shape of the frustum of a cone, at the desired elevated temperature for consumption, comprising:
  a flexible heating jacket having the shape of a frustum of a cone into which said container can be inserted such that said jacket substantially surrounds and contacts at least a portion of said container, said flexible heating jacket being capable of being transformed into a substantially flattened configuration when not enclosing said container;

electrically powered heating means embedded in said heating jacket; and means for supplying electric power to said heating jacket.

29. A device for keeping a hot beverage, contained in a container having the shape of the frustum of a cone, at the desired elevated temperature for consumption, said device comprising:

a flexible heating jacket having the shape of a frustum of a cone into which said container can be inserted such that said jacket substantially surrounds and contacts at least a portion of the curved surface of said container, said flexible heating jacket being capable of being transformed into a substantially flattened configuration when not enclosing said container;

electrically powered heating means embedded in said heating jacket;

means for supplying electric power to said heating jacket; and wherein the heating jacket comprises:

a flexible inner layer for contacting the beverage cup;

flexible electrical heating means disposed across the inner layer;

disconnectable electrical connector means for supplying electric power to said heating jacket, wherein the disconnectable electrical connector means comprises an electrically polarized connector which can be disconnectably connected to a mating connector comprised in said heating jacket;

flexible thermally-resistant electrical insulating material enclosing the electrical heating means; and a flexible thermally-insulating outer layer.

30. The device of claim 29 wherein the disconnectable electrical connector means for supplying electric power to said heating jacket comprise an electrical cord with an adapter at one end which can plug into and make electrical contact with a motor vehicle cigarette lighter, and an adapter at the other end which can plug into and make electrical contact with a mating connector comprised in the heating jacket.

31. The device of claim 29 wherein the disconnectable electrical connector means for supplying electric power to said heating jacket comprise an electrical adapter which can be plugged into and make electrical contact with standard 110/120 VAC electrical outlet with an electric cord terminating in and in electrical contact with an adapter at an opposite end which can plug into and make electrical contact with a mating connector comprised in the heating jacket.

32. The device of claim 31 wherein the electrical adapter comprises a step-down transformer to reduce the voltage supplied to the cup warmer.

33. The heating jacket of claim 32 wherein said electrical adapter further comprises a rectifier such that the adapter provides a DC supply to said heating jacket at the same voltage and polarity as would be provided by an automotive vehicle electrical supply.

34. The device of claim 29, wherein the means for supplying electric power to the heating jacket comprise batteries.

35. The device of claim 34 wherein the batteries are rechargeable.

36. The device of claim 34 wherein the batteries are contained in a battery holder detachably attached and disconnectably connected electrically to the heating jacket.

37. The device of claim 36 comprised in a cup holder permanently installed as an integral component of a motor vehicle, wherein the disconnectable electrical connection means provide electrical power to the heating jacket and recharge rechargeable batteries comprised therein.

38. The device of claim 29 wherein said flexible heating jacket comprises a substantially flat structure having upper and lower edges and lateral edges, wherein said upper and lower edges have the shape of sectors of concentric circles and said lateral edges have the shape of radii of said concentric circles, and wherein said heating jacket additionally comprises detachable attachment means such that said lateral edges may be detachably attached or overlapped so that said heating jacket forms a frustum of a cone.

39. The device of claim 34 wherein said batteries are contained in a battery holder which is flexibly attached to said heating jacket at at least one point and is detachably attached to said heating jacket at at least one other point, such that said battery holder can be detached from the at least one other point and folded flat when said heating jacket is transformed into a substantially flattened configuration.

40. The device of claim 39 comprised in a cup holder permanently installed as an integral component of a motor vehicle, wherein the disconnectable electrical connector means provide electrical power to the heating jacket and recharge said rechargeable batteries.

* * * * *